United States Patent
Nelson et al.

(10) Patent No.: US 8,986,606 B2
(45) Date of Patent: Mar. 24, 2015

(54) CHEMISTRY FOR EFFECTIVE MICROBE CONTROL WITH REDUCED GAS PHASE CORROSIVENESS IN PULP AND PAPER PROCESSING SYSTEMS

(75) Inventors: Mark Nelson, South Glens Falls, NY (US); Marko Kolari, Vantaa (FI); Juhana Ahola, Vantaa (FI)

(73) Assignee: Kemira Oyj (FI)

( * ) Notice: Subject to any disclaimer, the term of this patent is extended or adjusted under 35 U.S.C. 154(b) by 408 days.

(21) Appl. No.: 12/472,058

(22) Filed: May 26, 2009

(65) Prior Publication Data

US 2009/0291023 A1    Nov. 26, 2009

Related U.S. Application Data

(60) Provisional application No. 61/156,134, filed on Feb. 27, 2009, provisional application No. 61/055,775, filed on May 23, 2008.

(51) Int. Cl.
  *A61L 2/18*    (2006.01)
  *D21F 1/66*    (2006.01)
  (Continued)

(52) U.S. Cl.
  CPC ...  *D21F 1/66* (2013.01); *C02F 1/76* (2013.01); *C02F 1/50* (2013.01); *C02F 2103/28* (2013.01); *C02F 2303/08* (2013.01); *C02F 2303/20* (2013.01)
  USPC ............................................. 422/7; 422/37

(58) Field of Classification Search
  USPC ................................................. 422/37, 7, 29
  See application file for complete search history.

(56) References Cited

U.S. PATENT DOCUMENTS 1,378,644 A    5/1921    Baker
3,975,271 A    8/1976    Saunier et al.
(Continued)

FOREIGN PATENT DOCUMENTS

AU    5924890    1/1991
CA    2056379    12/1990
(Continued)

OTHER PUBLICATIONS

Machine Translation of JPO Application 2001-302796.*
(Continued)

*Primary Examiner* — Timothy Cleveland
(74) *Attorney, Agent, or Firm* — Kilpatrick Townsend & Stockton LLP

(57) ABSTRACT

Processes for biofilm or microorganism growth control in an aqueous system such as a pulp, paper or board manufacturing system are described in which a halogenated hydantoin is added to the aqueous system in combination with haloamine, chlorine dioxide or a combination thereof. The halogenated hydantoin is preferably a fully or partially halogenated dialkyl hydantoin, and more preferably 5,5-dimethyl hydantoin or 5-methyl-5-ethyl hydantoin. The haloamine is preferably a monohaloamine, dihaloamine, trihaloamine, or a combination thereof, and more preferably monochloramine, monobromamine, bromochloroamine or a combination thereof. The halogenated hydantoin is preferably added to the aqueous system in portions of the system susceptible to gas phase corrosion, such as the short loop of the system, and the haloamine and chlorine dioxide are preferably added to other portions of the system. The halogenated hydantoin and haloamine and/or chlorine dioxide maintain good compatibility with each other in the absence of excess free chlorine.

20 Claims, 1 Drawing Sheet

(51) Int. Cl.
*C02F 1/76* (2006.01)
*C02F 1/50* (2006.01)
*C02F 103/28* (2006.01)

(56) References Cited

U.S. PATENT DOCUMENTS

| | | | |
|---|---|---|---|
| 4,297,224 | A | 10/1981 | Macchiarolo et al. |
| 4,614,595 | A | 9/1986 | Azzarella et al. |
| 4,732,913 | A | 3/1988 | Donofrio et al. |
| 4,790,946 | A | 12/1988 | Jansen |
| 4,800,082 | A | 1/1989 | Karbowski et al. |
| 4,879,306 | A | 11/1989 | Henkels et al. |
| 4,916,159 | A | 4/1990 | Whitekettle et al. |
| 4,959,157 | A | 9/1990 | Karbowski |
| 4,966,775 | A | 10/1990 | Donofrio et al. |
| 4,988,444 | A | 1/1991 | Applegate et al. |
| 5,019,173 | A | 5/1991 | Gettings et al. |
| 5,070,200 | A | 12/1991 | Raynor |
| 5,071,569 | A | 12/1991 | Caulfield et al. |
| 5,236,600 | A | 8/1993 | Hutchins |
| 5,332,511 | A | 7/1994 | Gay et al. |
| 5,591,692 | A | 1/1997 | Jones et al. |
| 5,662,940 | A | 9/1997 | Hight et al. |
| 5,976,386 | A | 11/1999 | Barak |
| 6,132,628 | A | 10/2000 | Barak |
| 6,222,071 | B1 | 4/2001 | Delalu et al. |
| 6,429,181 | B2 | 8/2002 | Sweeny et al. |
| 6,478,973 | B1 | 11/2002 | Barak |
| 6,706,395 | B2 * | 3/2004 | Harrison et al. ............. 428/402 |
| 6,773,607 | B2 | 8/2004 | Russell |
| 6,881,583 | B2 | 4/2005 | Kahle |
| 7,008,545 | B2 | 3/2006 | Cronan, Jr. et al. |
| 7,045,659 | B2 | 5/2006 | Delalu et al. |
| 7,052,614 | B2 | 5/2006 | Barak |
| 7,067,063 | B2 | 6/2006 | Barak |
| 7,311,878 | B2 | 12/2007 | Singleton et al. |
| 7,449,120 | B2 | 11/2008 | Barak |
| 7,651,622 | B2 | 1/2010 | Barak |
| 7,736,520 | B2 | 6/2010 | Huitric |
| 7,820,060 | B2 | 10/2010 | Mayer et al. |
| 7,837,883 | B2 | 11/2010 | Barak |
| 8,051,383 | B2 | 11/2011 | McCampbell et al. |
| 2003/0029812 | A1 * | 2/2003 | Burns et al. .................. 210/764 |
| 2003/0077365 | A1 * | 4/2003 | Howarth ...................... 426/332 |
| 2003/0211210 | A1 * | 11/2003 | Howarth ...................... 426/332 |
| 2007/0045199 | A1 * | 3/2007 | Mayer et al. .................. 210/764 |
| 2007/0259938 | A1 | 11/2007 | Barak |
| 2008/0003305 | A1 | 1/2008 | Barak |
| 2008/0156740 | A1 | 7/2008 | Gupta et al. |
| 2008/0160604 | A1 | 7/2008 | Gupta et al. |
| 2008/0199901 | A1 * | 8/2008 | Enzien et al. .................. 435/29 |
| 2010/0183746 | A1 | 7/2010 | Barak |
| 2010/0206815 | A1 | 8/2010 | Garusi et al. |
| 2010/0310676 | A1 | 12/2010 | Barak |

FOREIGN PATENT DOCUMENTS

| | | |
|---|---|---|
| EP | 0343092 | 11/1989 |
| EP | 0403465 | 12/1990 |
| EP | 0517102 | 12/1992 |
| EP | 1293482 | 3/2003 |
| GB | 1600289 | 10/1981 |
| JP | 55-018259 | 2/1980 |
| JP | 61-210004 | 9/1986 |
| JP | 4071686 | 3/1992 |
| JP | 05-146785 | 6/1993 |
| JP | 07-171575 | 7/1995 |
| JP | 08-026917 | 1/1996 |
| JP | 08-176996 | 7/1996 |
| JP | 11-047755 | 2/1999 |
| JP | 2003104804 | 4/2003 |
| WO | WO 9015780 | 12/1990 |
| WO | WO 0155036 | 8/2001 |
| WO | WO 0228384 | 4/2002 |
| WO | WO 03001931 | 1/2003 |
| WO | WO 2006097578 | 9/2006 |
| WO | WO 2006097578 A1 * | 9/2006 |
| WO | WO 2006113221 | 10/2006 |
| WO | WO 2009143511 | 11/2009 |
| WO | WO 2011058282 | 5/2011 |
| WO | WO 2011065434 | 6/2011 |

OTHER PUBLICATIONS

J. Beck, et al., "Preformed Monochloramine Used as a Post-Disinfectant in Drinking Water Treatment at Sjaelsoø Water Works", Aqua No. 1, 1986, pp. 25-33.

M.M. Schirtzinger, "Chlorine Compounds for Microbiological Control", Paper Mill News, Most Newsworthy, Jul. 29, 1963, 5 pages.

Linn H. Enslow, "Ammonia—Chlorine Reactions and Chloramine Production", Contract Record and Engineering Review, Mar. 11, 1931, pp. 291-295.

Joseph Race, "Water Sterilization by Means of Chloramine", Engineering and contracting vol. XLVII, No. 11, Mar. 14, 1917, 3 pages.

Notice of Opposition to European Patent No. EP 1293482, dated Jun. 11, 2007, 15 pages.

Court of Commissioner of Patents for the Republic of South Africa, Bromine Compounds Limited and Buckman Laboratories (PTY) LTD, Case No./Patent No. 92/4018, Judgment and Order for Defendant Buckman Laboratories Counterclaim of Revocation of Patent SA 92/4018, dated Sep. 12, 2006, 64 pages.

International Preliminary Report on Patentability in Related PCT Application PCT/US2009/045147, dated Dec. 2, 2012, 8 pages.

Examination Report in related European Application 097517395, dated Feb. 24, 2012, 4 pages.

Examination Report in related European Application 097517395, dated Dec. 13, 2012, 6 pages.

Office Action in related Chinese Application 200980118633.x, dated Jan. 13, 2012, 13 pages.

Office Action in related Chinese Application 200980118633.x, dated Oct. 9, 2012, 8 pages.

Manual Translation of Japanese Patent Application No. 2003-104804, Apr. 9, 2003.

U.S. Environmental Protection Agency, Alternative Disinfects and Oxidants Guidance Manual, EPA-815-R-99-014, Apr. 1999, 346 pages.

F.G. Ferris, et al., Corrosion Products Associated with Attached Bacteria at an Oil Field Water Injection Plant, vol. 38, Jun. 1, 1992, pp. 1320-1326.

U.S. Environmental Protection Agency, Combined Sewer Overflow Technology Fact Sheet Chlorine Disinfection, EPA-832-F-99-034, Sep. 1999, 10 pages.

Frayne, Colin, "The Selection and Application of Nonoxidizing Biocides for Cooling Water Systems," The Analyst, The Voice of the Water Treatment Industry, Spring 2001, 15 pages.

New Jersey Department of Health and Senior Services, "Hazardous Substance Fact Sheet," Ammonium Carbamate, CAS No. 1111-78-0, Dot No. NA 9083, Jan. 1996, revised Mar. 2002, 6 pages.

Notice of Reexamination in related Chinese Application 200980118633.X, dated Nov. 25, 2014, 14 pages.

* cited by examiner

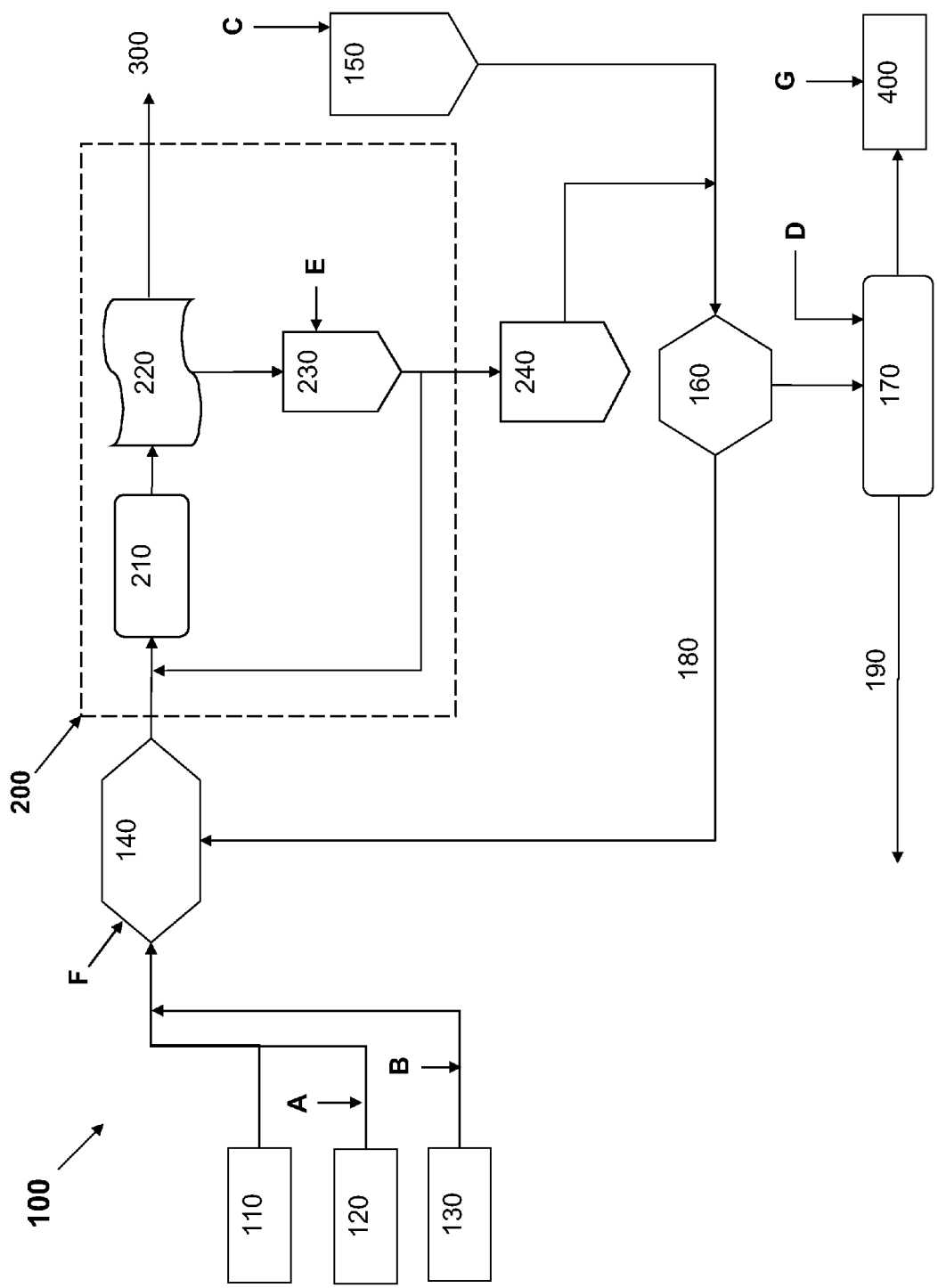

CHEMISTRY FOR EFFECTIVE MICROBE CONTROL WITH REDUCED GAS PHASE CORROSIVENESS IN PULP AND PAPER PROCESSING SYSTEMS

This application claims priority to U.S. Provisional Patent Application Ser. No. 61/055,775, filed on May 23, 2008, and 61/156,134, filed on Feb. 27, 2009, the disclosures of which are incorporated herein by reference in their entirety.

FIELD OF THE INVENTION

This application relates to improved chemical methods for microbe control in aqueous systems, and in particular in pulp and paper processing systems.

BACKGROUND OF THE INVENTION

A common problem in paper and pulp processing systems is biofilm, or slime, formation on surfaces of the system components. Biofilm is caused by bacteria in the various process waters in the system. Bacteria in the water can exist in either a free-floating form (known as planktonic) or can be attached to surfaces (known as sessile). Certain bacteria in the process waters such as *Deinococcus* and *Meiothermus* prefer the sessile state and are particularly effective biofilm formers. These bacteria, if present in sufficient amounts, can quickly attach to system surfaces and build up to undesirable levels.

Biofilm causes several problems in these systems. For example, biofilm masses that detach from system surfaces can be carried into the pulp waters and formed into the paper sheet. The biofilm masses weaken the formed paper sheet and can cause it to tear or cause holes in the paper. Clearing the tears or removing the damaged sections results in system down-time, lost paper product, reduced efficiency and increased costs. It is therefore desirable to both minimize bacteria in the process waters and to prevent biofilm formation on the system surfaces. A traditional method for controlling biofilm problems is to add microbe control chemicals to the process waters.

Halogenated hydantoins, such as bromochlorodimethylhydantoin, are known microbe control agents. Sweeny et al. (U.S. Pat. No. 6,429,181) teaches that partially halogenated hydantoins such as monochlorodimethylhydantoin (MCDMH) are effective at killing microbes in pulp and paper systems without adverse effects on the chemical additives used in the system. Halogenated hydantoins are effective at killing bacteria in the sessile state and preventing slime formations, but are more expensive than some other known methods of chemical microbe control.

Haloamines, such as chloramines and bromamines, are also known chemicals for microbe control. Haloamines can be formed by combining an ammonium source, such as ammonium sulfate, ammonium chloride, ammonium bromide, ammonium phosphate, ammonium nitrate or any other ammonium salt, including urea, with an oxidant such as sodium hypochlorite. Haloamines are less expensive to produce than halogenated hydantoins and are therefore becoming a more preferred chemical for microbe control of paper and pulp processing systems. Haloamines are effective at minimizing planktonic bacteria levels in the process waters and preventing slime formation on system surfaces, but when in their vapor phase can be very corrosive to system components. The evaporation tendency of haloamines can be orders of magnitude greater than that of sodium hypochlorite.

Other types of chemistry controls, such as chlorine dioxide, can also be used for microbe control. Chlorine dioxide is a good biocide since bactericidal efficacy of $ClO_2$ is not substantially influenced by pH, and $ClO_2$ does not leave toxic disinfection by-products. Chlorine dioxide, however, when dosed in process water remains in gaseous form and thus suffers from the same gas phase corrosion issues as haloamines.

In addition, it has been found that the bacteria that remain in haloamine or chlorine dioxide treated systems, such as in low-circulation chests, are some of the worst slime-formers. In the cases where haloamine or chlorine dioxide chemistry has lost microbe control, a rapid major slime outbreak has occurred. Typical reasons for loss of control include feed equipment failure or under-dosing to reduce cost.

Corrosion is a particular concern in the "short loop," or short circulation section, of a paper machine, and in the subsequent press and drying section. In a typical pulp and paper process, pulp stock is passed into a headbox, which distributes the pulp stock onto a moving wire in a forming section. The paper sheet is formed in the forming section and then sent to presses and dryers for finishing. The short loop is a system that re-circulates and recycles excess water from the pulp stock. The excess water is collected in a wire pit in the forming section and then a major portion thereof is recirculated back to the headbox for re-use. Although many tanks, lines and other immersed structures of pulp and paper systems are typically formed from acid-proof stainless steel, many components above the water surface level, and in the press and dryer section, are formed from milder steel materials. Especially these components are thus adversely affected by gas phase corrosion when haloamine or chlorine dioxide chemistries are utilized for microbe control.

In practice, the cost savings that result from using haloamines or chlorine dioxide for microbe control overcomes the gas-phase corrosion concerns in these systems. Nevertheless, it would be desirable to employ a chemical method for microbe control that benefits from the cost savings achievable through the use of haloamines or chlorine dioxide and that simultaneously minimizes gas-phase corrosion of steel components of the machine.

SUMMARY OF THE INVENTION

Processes for biofilm or microorganism control in an aqueous system such as a pulp, paper or board manufacturing system are described in which a halogenated hydantoin is added to the aqueous system in combination with haloamine, chlorine dioxide or a combination thereof.

The halogenated hydantoin is preferably a fully or partially halogenated dialkyl hydantoin, and more preferably chlorinated 5,5-dimethyl hydantoin or 5-methyl-5-ethyl hydantoin.

The haloamine is preferably a monohaloamine, dihaloamine, trihaloamine, or a combination thereof, and more preferably monochloramine, monobromamine, bromochloroamine or a combination thereof, formed by combining an ammonium source and an oxidant.

The halogenated hydantoin is preferably added to the aqueous system in those portions of the system susceptible to gas phase corrosion, such as the short loop of the system, and the haloamine and/or chlorine dioxide are preferably added to other portions of the system.

The halogenated hydantoin and haloamine and/or chlorine dioxide maintain good compatibility with each other in the absence of excess free chlorine.

BRIEF DESCRIPTION OF THE DRAWINGS

FIG. 1 is a simplified schematic diagram of a pulp and paper processing system.

DETAILED DESCRIPTION OF THE INVENTION

Current practices have shown that keeping the paper machine short loop free of biofilm with haloamine or chlorine dioxide chemistry for microbe control requires continuous or periodical addition of haloamine or chlorine dioxide in the paper machine short loop. This poses a significant risk for gas phase corrosion. Surprisingly, it has been found that corrosion in the paper machine short loop can be eliminated or at least markedly reduced by continuous or periodical application of halogenated hydantoin chemistry, either with no haloamines or chlorine dioxide present in the short loop or in the presence of low levels of haloamines or chlorine dioxide in the short loop. The low amounts of haloamine or chlorine dioxide in the short loop reduces the risk for gas phase corrosion, while halogenated hydantoin addition keeps the short loop free of slime, providing the benefit of low overall cost. The combination of these chemistries does not compromise the efficacy of the microbe control in the system. The low amounts of haloamine or chlorine dioxide in the short loop may be due to low dosing level in the short loop, or due to background, e.g., residual haloamine or chlorine dioxide flowing into the short loop from other portions of the process.

The present application is directed to a haloamine or chlorine dioxide chemistry based microbe control method for use in pulp and paper processing systems. The haloamine or chlorine dioxide method according to an embodiment of the invention utilizes halogenated hydantoin chemistry based microbe and biofilm growth control in selected portions of the system where gas phase corrosion from chlorine dioxide or the haloamine in its gaseous phase would otherwise occur, such as in the short loop of the pulp and paper processing system. Other sensitive areas for gas phase corrosion are press section and dryer section. Also, shower water areas in the short loop or press section are prone for gas phase corrosion. The features and advantages of the present invention are described below with respect to possible embodiments in a pulp and paper processing system, however, as will be recognized by those of ordinary skill in the art, multiple other embodiments are possible and enabled by the following description.

As described above, it has been known that one of haloamines, chlorine dioxide or halogenated hydantoins can be used for microbe control in pulp and paper machine waters. Use of more than one of these chemistries in the same system, however, has not been practiced. Moreover, there has previously been no evidence that haloamines or chlorine dioxide are compatible with halogenated hydantoins. To the contrary, previous literature encourages the careful use of chlorine when practicing haloamine chemistry for paper machine microbe control. For example, it is known that equimolar concentrations of ammonium bromide and active chlorine, or equimolar concentrations of other ammonium salts and active chlorine, should be used in order to produce the beneficial haloamine product. High ratios of active chlorine to nitrogen will not yield the beneficial monohaloamines. Thus, it was previously thought that halogenated hydantoins should not be used in the same system as haloamine or chlorine dioxide chemistries, because it was believed that one or both of these chemicals would be consumed or degraded by the other, resulting in adverse microbe control performance by these chemicals. As discussed below, however, applicants have surprisingly discovered that these chemicals can be added in the same system, without a substantial number of harmful cross-reactions, if the chemicals are prepared in compatible ratios and if there is no substantial excess of free chlorine in the water. The halogenated hydantoins thus reduce gas phase corrosion in the system without compromising the total microbe control efficiency in the system.

In one embodiment, the combined haloamine or chlorine dioxide and halogenated hydantoin chemistry microbe and biofilm growth control system is employed in a pulp and paper processing system such as the one illustrated in FIG. 1.

In a preferred embodiment, haloamine (chloramine or bromamine) is utilized in combination with halogenated hydantoin in the pulp and paper processing system. In this embodiment the haloamine is preferably a chloramine, which can be formed by combining an ammonium salt and an active chlorine source. A preferred ammonium salt is ammonium sulfate and a preferred chlorine source is sodium hypochlorite. When ammonium sulfate and sodium hypochlorite are combined in alkaline conditions, monochloramine (MCA) is formed. In another preferred embodiment, the ammonium salt is ammonium bromide. When combined with sodium hypochlorite in alkaline conditions, a bromine-containing haloamine (bromamine, BA) is formed.

A preferred halogenated hydantoin is a fully or partially halogenated dialkyl hydantoin, such as 5,5-dimethyl hydantoin or 5-methyl-5-ethyl hydantoin. A more preferred halogenated hydantoin is monochloro-5,5-dimethylhydantoin, MCDMH, which can be formed by combining a liquid hydantoin and sodium hypochlorite according to the process described in U.S. Pat. No. 6,429,181, Sweeny et al., the disclosure of which is incorporated herein by reference. Other halogenated hydantoins that could be used in the processes described herein include chlorobromo-5,5-dimethylhydantoin, dichloro-5,5-dimethylhydantoin, dibromo-5,5-dimethylhydantoin, monobromo-5,5-dimethylhydantoin, a partially halogenated dialkyl hydantoin formed by mixing dialkyl hydantoin with a halogen-containing oxidizer, or a combination thereof.

Although the haloamine and/or halogenated hydantoin can be formed by combining the precursor compositions in the process waters, it is preferable to pre-form the haloamine and the halogenated hydantoin and then add them to the process waters.

For systems where chlorine dioxide is used in combination with halogenated hydantoin, chlorine dioxide can be formed on-site, e.g. at paper machine with an on-site generator, from precursors or alternatively acquired from the pulp mill's bleaching process.

Haloamine or chlorine dioxide chemistry for microbe control is generally utilized throughout the system to minimize planktonic bacteria levels in the system and to prevent biofilm formation on the system surfaces. The haloamine or chlorine dioxide can be added at almost any point in the system so as to generally maintain microbe control throughout the system. In this embodiment the haloamine or chlorine dioxide is preferably not added to the short loop, although it is possible for small amounts of haloamine or chlorine dioxide to be added in the short loop as long as the concentrations are low enough so as to minimize the risk of haloamine/chlorine dioxide gas phase corrosion in the short loop, press and/or dryer sections of the system.

Referring now to an exemplary pulp and paper processing system 100 as shown in FIG. 1 for illustrative purposes only, pulp from pulp mill 110, pulpers 120, and broke system 130 is pumped to paper machine blend chest 140.

The pulp is then pumped to the short loop 200 of the system 100, which includes headbox 210, forming section 220 and wire pit 230. Paper sheets are formed in the forming section 220 and sent to presses and dryers 300.

A part of recovered water and residual, unformed fibers from wire pit 230 return to headbox 210, whereas the other part of the recovered water and residual, unformed fibers exit the short loop 200 and are pumped to white water silo 240 and combine with water and fibers coming from couch pit 150 in save-all 160. Save-all 160 concentrates residual fibers as recovered stock 180 and recirculates the recovered stock 180 to the paper machine blend chest 140. Water is recovered in water recovery section 170 and re-used as dilution water 190 for importing pulp from pulp mill 110, in the pulpers 120 and in the paper machine blend chest 140. A small part of water in water recovery section 170 is sent to shower water tank 400 and used in showers, e.g., at the forming section 220.

Chemicals for microbe control in the system 100 can be injected at multiple points throughout the system. Exemplary, but by no means limiting, injection points illustrated in FIG. 1 include:

Injection point A: in pulpers 120 or process streams upstream/down stream of the pulpers;

Injection point B: in broke system 130, or process streams upstream/downstream of vessels therein;

Injection point C: in couch pit 150, or process streams upstream/downstream of the couch pit;

Injection point D: in water recovery section 170;

Injection point E: in wire pit 230 (in the short loop 200), or process streams upstream/downstream of the pit;

Injection point F: in paper machine blend chest 140, or process streams upstream/downstream of the chest; and Injection point G: shower water tank 400, or process streams upstream/downstream of the tank.

In one embodiment, haloamine is added at injection points A, B, C and D. As discussed above, the haloamine could be replaced with, or used in conjunction with, chlorine dioxide chemistry controls. Halogenated hydantoin is preferably added in wire pit 230 at injection point E, in paper machine blend chest 140 at injection point F, and shower water tank 400 at injection point G. Alternatively, however, halogenated hydantoin is added only in wire pit 230 at injection point E. It will be recognized that the system can include additional injection points not described above, or that one or more of the injection points described above could be omitted from the system.

Tables 1 and 2 of Examples 1 and 2 below demonstrate that gas phase corrosion is minimized if the ratio of halogenated hydantoin to haloamine/chlorine dioxide is maintained at about 4:1 or greater (based on total active chlorine content). It will be understood, however, that the data provided in these examples was derived in laboratory conditions, and that a skilled artisan could determine appropriate ratios of halogenated hydantoin to haloamine/chlorine dioxide that would minimize gas phase corrosion in actual pulp and paper systems.

As discussed, in one embodiment a preferred haloamine for use in the process is MCA. Another preferred haloamine is a bromine-containing haloamine (bromamine, BA). The MCA or BA is preferably added in a continuous process, and is preferably fed to provide a total active chlorine concentration of from about 0.1-5 ppm throughout the haloamine-treated portions of the system. More preferably, the active chlorine concentration in these portions of the system is about 0.75-2 ppm.

Alternatively, slug dosing could be used to introduce the haloamine to the process stream. A preferred concentration for MCA or BA in such a system would be about 1-10 ppm, with 3-7 ppm being particularly preferred. The slugs would preferably be fed for about 3-30 minutes each about 6-24 times a day, and are more preferably fed for about 5-15 minutes each about 12-24 times a day. Slug dosing, as referred to herein, is a term known by one skilled in the art and refers to periodical, or batch, dosing of chemicals into the system, as contrasted with a continuous dosing method as described above.

As discussed, in one embodiment chlorine dioxide chemistry control is used. Chlorine dioxide is preferably added in a continuous process, and is preferably fed to provide a total active chlorine concentration of from about 0.1-10 ppm throughout the treated portions of the system. More preferably, the active chlorine concentration in these portions of the system is about 1-4 ppm.

Alternatively, slug dosing could be used to introduce the chlorine dioxide to the process stream. A preferred concentration for $ClO_2$ in such a system would be about 1-15 ppm, with 3-7 ppm being particularly preferred. The slugs would preferably be fed for about 3-30 minutes each about 6-24 times a day, and are more preferably fed for about 5-15 minutes each about 12-24 times a day.

The halogenated hydantoin is preferably used in targeted portions of the system where gas phase corrosion is more of a concern, i.e., in portions of the system that have components formed from non-acid-proof stainless steel and other milder steel grades. The short loop 200 is a particularly preferred location for dosing halogenated hydantoin chemistry, because of the potential for volatilization and because the components in the subsequent press and dryer section have an elevated risk for gas phase corrosion. Another preferred location for halogenated hydantoin is in the paper or board machine shower water tank 400, as this water is often used in showers also in the short loop or press section and is at risk for possible haloamine or chlorine dioxide volatilization.

The halogenated hydantoin, which in one embodiment is partially halogenated hydantoin, such as MCDMH, is preferably slug-dosed into the system. The MCDMH is preferably dosed to provide an active chlorine concentration of 1-15 ppm in the stream being treated. A preferred dosage is 3-8 ppm as active chlorine. The slug dosings are preferably made about 1-12 times a day for about 5-90 minutes each. More preferably, the slugs are added about 3-6 times a day for about 15-45 minutes each.

Alternatively, the MCDMH could be added in a continuous process, and is preferably fed to give a minimum active chlorine concentration of from about 0.1-5 ppm in the stream being treated. More preferably, the total active chlorine concentration in the process stream is about 0.5-2 ppm. All concentrations expressed herein refer to active chlorine in the process stream being treated.

As discussed, although halogenated hydantoins are more expensive to produce than haloamines or chlorine dioxide and thus not as attractive a choice in controlling planktonic bacteria levels in the pulp and paper processing waters, by generally utilizing haloamine or chlorine dioxide control throughout most of the system and utilizing halogenated hydantoin control in selected portions of the system, it is possible to take advantage of the cost and bactericidal advantages of the haloamine or chlorine dioxide while also utilizing halogenated hydantoins to minimize gas phase corrosion of the pulp & paper machinery. The use of halogenated hydantoins in the short loop 200, for example, results in less haloamine or chlorine dioxide carrying over to the press and dryer systems, which are especially prone to gas phase corrosion.

It will be recognized that although it is preferable to utilize halogenated hydantoin chemistry only in areas prone to gas phase corrosion such as injection points E and G shown in FIG. 1 (because of the current higher cost of using halogenated hydantoin chemistry as compared to haloamine or chlorine dioxide chemistry), in view of the previously unrecognized and surprising chemical compatibilities described herein the halogenated hydantoin chemistry could be used with haloamine or chloride dioxide chemistry in other parts of the pulp and paper system. The halogenated hydantoin chemistry could, in fact, be used with haloamine or chloride dioxide chemistry throughout the entire system and could be added at any of the injection points (A→G) illustrated in FIG. 1 or at other injection points not shown in FIG. 1.

The following non-limiting examples demonstrate the reduced gas phase corrosion that results when either haloamines or chlorine dioxide are used in combination with halogenated hydantoins. These examples also illustrate the surprising compatibility between haloamines or chlorine dioxide and halogenated hydantoins. The halogenated hydantoins thus reduce gas phase corrosion in an aqueous system without compromising the killing efficiency of the other biocides in the system.

EXAMPLE 1

This laboratory experiment was done with circulating water collected from a paper machine producing coated fine paper from birch, pine and eucalyptus pulp. The aerobic bacteria content of the sample was measured with Plate Count Agar (PCA) and incubation time of 2 days at 45° C. The sample contained aerobic bacteria at a concentration of 5,000 CFU/ml. The sample pH was 7.5. Paper machine circulation water was divided into 7 glass beakers. One steel plate was placed horizontally on top of each beaker. Metal plates used in this study were carbon steel EN 10149-2 (C 0.058%, Si 0.183%, Mn 1.79%, Al 0.035%, Ti 0.127%).

Fresh chemicals were prepared just prior the experiment. A 15% solution of dimethylhydantoin was mixed equimolar with sodium hypochlorite, yielding a mixture of monochlorodimethylhydantoin (MCDMH) with a total active chlorine content of 5.6%. A dilute ammonium sulfate solution, pH adjusted to 9.5, was mixed equimolar with sodium hypochlorite, to produce a solution of monochloramine (MCA) with a total active chlorine content of 1.0%.

Chemicals were dosed in the beakers on the basis of total active chlorine content. The beakers were kept standing on table at room temperature. 60 minutes after the initial dosage the killing efficacy was measured by plating a sample from each beaker (PCA, 45° C., 2 d). The chemical dosing was repeated 6 hours later, with the same dosages. The steel plates were regularly observed and any signs of gas phase corrosion recorded.

Table 1 illustrates the relative bactericidal efficacy and gas phase corrosiveness of MCDMH, MCA, and MCDMH in combination with MCA in paper machine circulating water.

After one day the steel coupons on top of the reference beaker or the beakers treated with MCDMH showed no signs of corrosion, whereas coupons on top of the beakers containing MCA showed very clear corrosion visible to naked eye. Corrosion of steel coupons on top of beakers containing MCA+MCDMH mixtures was clearly less than in the case of MCA alone, however, bacterial counts showed that all treatments killed bacteria effectively, with >99% reduction. The results suggest that an effective way to reduce gas phase corrosion risk is to reduce the proportion of MCA compared to MCDMH, while maintaining good killing efficacy of microbes.

EXAMPLE 2

This laboratory experiment was done with circulating water collected from a paper machine producing coated fine paper. The sample contained aerobic bacteria 1,500,000 CFU/ml (2 d, 45° C.). The sample pH was 7.5 and oxidation reduction potential (ORP) +151 mV. Paper machine circulation water was divided into 10 glass beakers. One steel plate was placed horizontally on top of each beaker. Metal plates were of same carbon steel as in Example 1. Fresh chemicals were prepared just prior the experiment. A 15% solution of dimethylhydantoin was mixed equimolar with sodium hypochlorite, yielding a mixture of monochlorodimethylhydantoin (MCDMH) with total active chlorine content of 5.6%. A dilute ammonium sulfate solution, pH adjusted to 9.5, was mixed equimolar with sodium hypochlorite, to produce a solution of monochloramine (MCA) with total active chlorine content of 1.0%. A dilute ammonium bromide solution was mixed equimolar with sodium hypochlorite (mixture pH near 10), producing a biocidal solution of bromine-activated chloramine (bromamine, BA) with total active chlorine content of 0.3%. A chlorine dioxide solution was collected from a pulp mill, with total active chlorine content of 1.3%. Chemicals were dosed in the beakers on the basis of total active chlorine content. The beakers were kept standing on table at room temperature. Two hours after the initial dosage the killing efficacy was measured by plating a sample from each beaker (total bacteria count, 2 d, 45° C.). The steel plates were regularly observed and any signs of gas phase corrosion recorded.

Table 2 illustrates the relative bactericidal efficacy and gas phase corrosiveness of MCDMH, MCA, BA or $ClO_2$ alone, and MCDMH in combination with the other oxidants in paper machine circulating water.

TABLE 1

| Treatment | Dosage (mg/l, total active $Cl_2$) | CFU/ml (contact time 60 min) | Cumul. dosage (mg/l, total active $Cl_2$) | Gas phase corrosion of the steel coupons 1 day | Gas phase corrosion of the steel coupons 4 days |
|---|---|---|---|---|---|
| Untreated reference | 0 | $5 \times 10^3$ | 0 | − | − |
| MCA | 5 | $<5 \times 10^1$ | 10 | ++ | ++++ |
| MCA | 10 | $<5 \times 10^1$ | 20 | +++ | ++++ |
| MCDMH | 5 | $<5 \times 10^1$ | 10 | − | − |
| MCDMH | 10 | $<5 \times 10^1$ | 20 | − | − |
| MCA + MCDMH | 1 + 4 | $<5 \times 10^1$ | 2 + 8 | + | + |
| MCA + MCDMH | 2 + 8 | $<5 \times 10^1$ | 4 + 16 | + | + |

MCA = monochloramine,
MCDMH = monochloro-5,5-dimethylhydantoin

TABLE 2

| Treatment | Dosage (mg/l, total active $Cl_2$) | CFU/ml (contact time 2 h) | Gas phase corrosion of the steel coupons 1 day | Gas phase corrosion of the steel coupons 4 days |
|---|---|---|---|---|
| Untreated reference | 0 | $1.5 \times 10^6$ | − | − |
| MCA | 10 | $<2 \times 10^2$ | +++ | ++++ |
| MCDMH | 10 | $<2 \times 10^2$ | − | − |
| BA | 10 | $<2 \times 10^2$ | +++ | ++++ |
| $ClO_2$ | 15 | $<2 \times 10^2$ | +++ | +++ |
| MCDMH + MCA | 9 + 1 | $<2 \times 10^2$ | − | + |
| MCDMH + BA | 8 + 2 | $<2 \times 10^2$ | + | ++ |
| MCDMH + BA | 9 + 1 | $<2 \times 10^2$ | − | + |
| MCDMH + $ClO_2$ | 13 + 2 | $<2 \times 10^2$ | − | + |

TABLE 2-continued

| Treatment | Dosage (mg/l, total active Cl$_2$) | CFU/ml (contact time 2 h) | Gas phase corrosion of the steel coupons | |
|---|---|---|---|---|
| | | | 1 day | 4 days |
| MCDMH + ClO$_2$ | 9 + 1 | <2 × 10$^2$ | − | + |

MCA = monochloramine,
BA = bromamine,
MCDMH = monochloro-5,5-dimethylhydantoin,
ClO$_2$ = chlorine dioxide After one day the steel coupons on top of the reference beaker and the beaker treated with MCDMH showed no signs of corrosion, whereas coupons on top of the beakers containing MCA, BA or chlorine dioxide showed very clear gas phase corrosion visible to the naked eye. Corrosion of steel coupons on top of beakers containing MCDMH+MCA mixture, MCDMH+BA mixture, or MCDMH+ClO$_2$ mixture was clearly less than in the case of MCA, BA or ClO$_2$ alone. However, bacterial counts showed that all treatments killed bacteria effectively, with >99.9% reduction. The results suggest that an effective way to reduce gas phase corrosion risk is to reduce the proportion of MCA, BA or ClO$_2$ compared to MCDMH, while maintaining the good microbe killing efficacy.

EXAMPLE 3

Fresh MCA and MCDMH solutions were prepared at room temperature. Tap water was divided in five containers and treated as follows:
A. MCA 3.00 mg/l (as total active chlorine), formed from diluted and pH-adjusted ammonium sulfate (Fennosurf 580) and sodium hypochlorite.
B. DMH (Fennosurf 300) mixed with sodium hypochlorite at 1:1 molar ratio to form MCDMH; dosed at approximately 2.5 ppm as total active chlorine.
C. DMH (Fennosurf 300) mixed with sodium hypochlorite at a 1:2 molar ratio to form MCDMH and free HOCl (hypochlorous acid, or free chlorine) in a 1:1 ratio; dosed at approximately 5 ppm as total active chlorine.
D. Mixture of A and B at a 1:1 volumetric ratio.
E. Mixture of A and C at a 1:1 volumetric ratio.

The mixtures were allowed to stand for 20 hours. Total active chlorine was regularly measured with a Hach DPD test kit.

TABLE 3

| Mixture | Total Active Chlorine (mg/l) | | | | | | |
|---|---|---|---|---|---|---|---|
| | 0 min. | 15 min. | 30 min. | 45 min. | 60 min. | 2 hrs. | 20 hrs. |
| A. MCA 3 ppm | 2.84 | 2.90 | 2.80 | 2.76 | 2.68 | 2.74 | 2.34 |
| B. MCDMH 2.5 ppm | 2.47 | 2.44 | 2.51 | 2.52 | 2.39 | 2.39 | 1.80 |
| C. MCDMH 2.5 ppm + free HOCl 2.5 ppm | 4.96 | 4.80 | 4.52 | 4.07 | 3.88 | 3.56 | 1.96 |
| D. A + B (1:1) | 2.64 | 2.68 | 2.52 | 2.51 | 2.43 | 2.28 | 1.46 |
| E. A + C (1:1) | 1.92 | 1.62 | 1.65 | 1.45 | 1.48 | 1.39 | 0.86 |

In mixture D, two solutions with almost equal total active chlorine concentration were mixed. After mixing, the measured total active chlorine was almost the same. The results indicate that MCA and MCDMH can be well dosed in the same aqueous environment at the same time without any significant loss of active halogen.

In mixture E, the expected total active chlorine content from mixing solutions A and C was approximately 4 ppm. However, the results shown above indicate that an excess of free HOCl will rapidly degrade MCA, and some loss of active chlorine occurs.

EXAMPLE 4

The study was continued by including another mixture of DMH (Fennosurf 300) and HOCl, at a molar ratio of approximately 1:1.3, in the test.

TABLE 4

| Mixture | Total Active Chlorine (mg/l) | | | |
|---|---|---|---|---|
| | 0 min. | 10 min. | 30 min. | 2 hours |
| A. MCA 2.5 ppm | 2.43 | 2.23 | 2.12 | 2.24 |
| B. MCDMH 2.5 ppm (DMH:sodium hypochlorite in a 1:1 molar ratio) | 2.53 | 2.28 | 2.28 | 2.45 |
| C. MCDMH 2.5 ppm + HOCl 0.7 ppm (1:1.3 ratio) | 2.89 | 2.61 | 2.43 | 2.46 |
| D. MCDMH 2.5 ppm + HOCl 2.5 ppm (1:2 ratio) | 4.41 | 3.80 | 3.47 | 3.14 |
| E. A + B | 2.20 | 2.28 | 2.28 | 2.30 |
| F. A + C | 2.26 | 2.22 | 2.39 | 2.37 |
| G. A + D | 3.15 | 2.11 | 1.06 | 1.44 |

The results illustrated above confirm those of Example 3:
Partially halogenated hydantoin (in this case MCDMH formed from Fennosurf 300 and hypochlorite) and monochloramine (formed from diluted ammonium sulfate (Fennosurf 580) and sodium hypochlorite) can be well dosed together in the same aqueous environment if compatible ratios of hydantoin and HOCl are used (in this example 1 mole of DMH to ≤1.3 moles of HOCl performed well).

In mixture G, the expected total active chlorine content was near 4 ppm. However, the results showed that an excess of free HOCl (such as 1 mole of DMH to 2 moles of HOCl) degrades MCA rapidly and some loss of active chlorine will occur.

As Examples 3 and 4 illustrate, compatibility of MCA and MCDMH is shown at molar ratios of DMH to hypochlorite up to about 1:1.3. It was found that free hypochlorite in excess of a ratio of about 1:2 resulted in a more detrimental loss of MCA, and that some loss of active chlorine occurred. It is likely that some molar ratios of DMH to hypochlorite of between about 1:1.3 and 1:2 would also provide for suitable compatibility between MCA and MCDMH—further studies are ongoing to clarify the acceptable upper limit for the ratio of DMH to hypochlorite. A preferred molar ratio when combining DMH and hypochlorite is from about 1:1 to 1:1.7.

EXAMPLE 5

This laboratory experiment was done with circulating water collected from a paper machine producing uncoated copy paper at pH 8. The sample was divided into 8 glass bottles. Two 20 mm×50 mm coupons of EN 10149-2 low carbon steel was placed vertically hanging in the air phase of each bottle. The bottles were kept standing on table at room temperature. Fresh chemicals were prepared just prior the experiment. A 15% solution of dimethylhydantoin was mixed equimolar with sodium hypochlorite, yielding a mixture of monochloro-5,5-dimethylhydantoin (MCDMH) with total active chlorine content of 5.6%. A dilute ammonium sulfate solution, pH adjusted to 9.5, was mixed equimolar with sodium hypochlorite, to produce a solution of monochloramine (MCA) with total active chlorine content of 1.0%. Chemicals were dosed in the bottles on the basis of total active chlorine content. The same dose was added to each bottle thrice during the experimental period. The steel coupons were regularly observed and any signs of gas phase corrosion recorded. At the end of the experiment the coupons were acid-washed, weight losses measured and corrosion rates calculated.

Table 5 illustrates the gas phase corrosiveness of MCDMH or MCA alone, and MCDMH in combination with MCA in paper machine circulating water.

TABLE 5

| Treatment | Dosage (mg/l, total active Cl$_2$) | Gas phase corrosion of the steel coupons after 7 d | |
|---|---|---|---|
| | | Visual | Corrosion rate (μm/y) |
| Untreated reference | 0 | – | 4 |
| MCA | 5 | +++ | 21 |
| MCDMH | 5 | – | 7 |
| MCA | 10 | ++++ | 44 |
| MCDMH | 10 | – | 6 |
| MCDMH + MCA | 5 + 5 | +++ | 19 |
| MCDMH + MCA | 8 + 2 | + | 12 |
| MCDMH + MCA | 9 + 1 | – | 7 |

MCA = monochloramine;
MCDMH = monochloro-5,5-dimethylhydantoin

Results from this one-week gas phase corrosion test confirmed results from the previous studies—MCA was substantially more corrosive than MCDMH at similar use concentrations on total active chlorine basis. Corrosion of steel coupons in the air phase of bottles containing MCDMH and MCA in mixture was substantially less than with MCA alone, and preferably when MCDMH was 80% or more of the total active chlorine content. These results suggest that an effective way to reduce gas phase corrosion risk is to reduce the proportion of MCA compared to MCDMH, while maintaining the good microbe killing efficacy.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope.

What is claimed is:

1. A method for biofilm or microorganism growth control in a circulating water system, comprising selectively dosing only to one or more targeted portions of the system susceptible to gas phase corrosion a composition comprising a halogenated hydantoin and separately dosing to the circulating water system a composition comprising a haloamine.

2. The method of claim 1, wherein the circulating water system is a pulp, paper or board manufacturing system.

3. The method of claim 1, wherein the halogenated hydantoin is fully or partially halogenated dialkyl hydantoin.

4. The method of claim 1, wherein the halogenated hydantoin is 5,5-dimethyl hydantoin or 5-methyl-5-ethyl hydantoin.

5. The method of claim 4, wherein the halogenated hydantoin is chlorobromo-5,5-dimethylhydantoin, dichloro-5,5-dimethylhydantoin, dibromo-5,5-dimethylhydantoin, monochloro-5,5-dimethylhydantoin, monobromo-5,5-dimethylhydantoin, a partially halogenated dialkyl hydantoin formed by mixing dialkyl hydantoin with a halogen-containing oxidizer, or a combination thereof.

6. The method of claim 5, wherein the halogen containing oxidizer is hypochlorite, hypobromous acid, a solid active chlorine-releasing agent, or a combination thereof.

7. The method of claim 1, wherein the haloamine is a monohaloamine, dihaloamine, trihaloamine, or a combination thereof.

8. The method of claim 7, wherein the haloamine is monochloramine, monobromamine, bromochloroamine or a combination thereof.

9. The method of claim 1, wherein the haloamine is preformed by reacting an ammonium salt with an oxidizer or is formed in-situ in the circulating water system by separately dosing an ammonium salt and an oxidizer into the circulating water system.

10. The method of claim 1, wherein the one or more targeted portions of the system susceptible to gas phase corrosion is a short loop or a press and dryer section, and wherein the short loop comprises a headbox, a forming section and a wire pit.

11. The method of claim 10 wherein the circulating water system further comprises a paper machine blend chest and the halogenated hydantoin is dosed to the circulating water system prior to or in the wire pit, paper machine blend chest, or both.

12. The method of claim 11, wherein the halogenated hydantoin is dosed to the wire pit.

13. The method of claim 10, wherein the portion of the system susceptible to gas phase corrosion is a paper or board machine forming and press section which uses shower water and wherein the halogenated hydantoin is dosed to the paper or board machine shower water.

14. The method of claim 10, wherein the halogenated hydantoin is dosed in an amount sufficient for biofilm growth control in the absence of haloamines or with haloamines present in such low amounts that gas phase corrosion is minimized in the one or more targeted portions of the system that are susceptible to gas phase corrosion.

15. The method of claim 10, wherein the halogenated hydantoin comprises partially halogenated hydantoin and the partially halogenated hydantoin and haloamine are dosed to the circulating water system in amounts such that the mole ratio of the partially halogenated hydantoin to free chlorine is less than 2.

16. The method of claim 15, wherein the partially halogenated hydantoin and haloamine are dosed to the circulating water system in amounts such that the mole ratio of the partially halogenated hydantoin to free chlorine is between 1.0 to 1.7.

17. The method of claim 15, wherein the partially halogenated hydantoin and haloamine are dosed to the circulating water system in amounts such that the mole ratio of the partially halogenated hydantoin to free chlorine is between 1.0 to 1.3.

18. The method of claim 1, wherein the halogenated hydantoin and haloamine are each independently dosed to the circulating water system in a continuous process, a batch process, or a combination of a continuous and a batch process.

19. The method of claim 10, wherein the system has a gas phase corrosion rate below 10 μm per year in a forming or in a press section of the system.

20. The method of claim 1, wherein the one or more targeted portions of the system susceptible to gas phase corrosion comprise components formed from non-acid-proof stainless steel or other milder steel grades.

* * * * *